April 23, 1946.   T. M. BERRY ET AL   2,398,997
VARIABLE SPEED GEAR TRANSMISSION
Filed Feb. 22, 1943
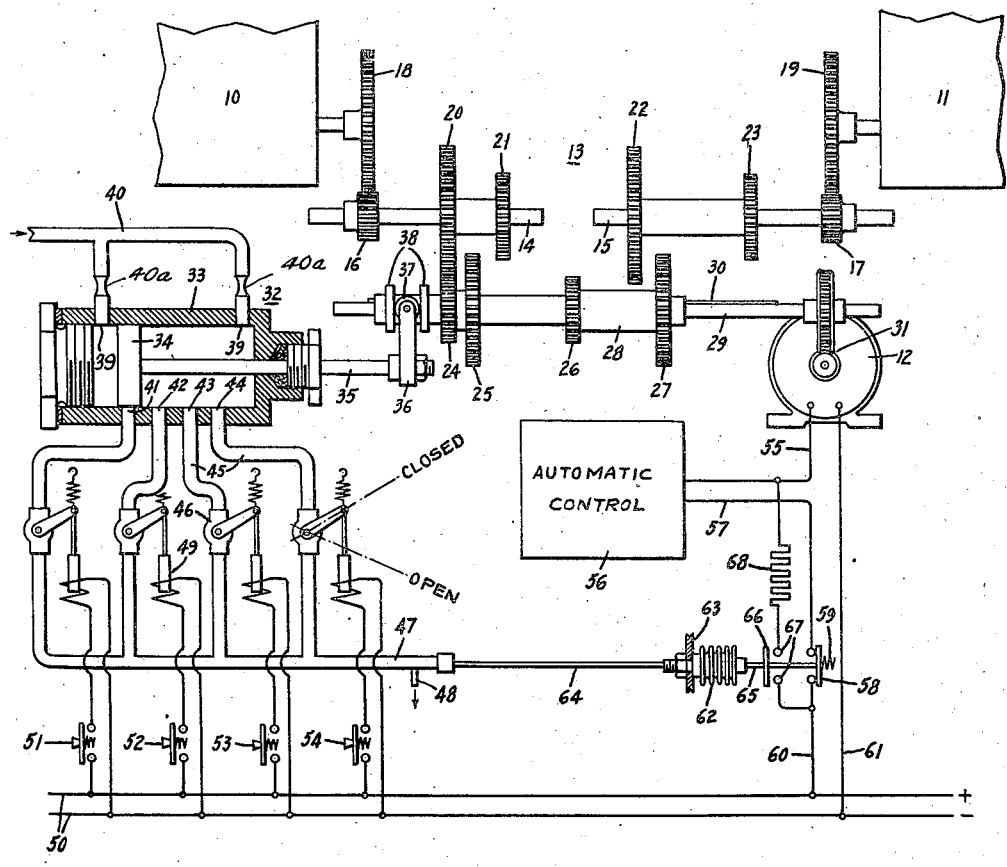
Inventors:
Theodore M. Berry,
Alfred H. Canada,
by *Harry E. Dunham*
Their Attorney.

Patented Apr. 23, 1946

2,398,997

UNITED STATES PATENT OFFICE 2,398,997

VARIABLE-SPEED GEAR TRANSMISSION

Theodore M. Berry, Schenectady, N. Y., and Alfred H. Canada, Fort Belvoir, Va., assignors to General Electric Company, a corporation of New York Application February 22, 1943, Serial No. 476,664

4 Claims. (Cl. 74—472)

The present invention relates to variable speed gear transmission including a driving shaft with a plurality of gears thereon and driven shaft means with gears cooperatively associated with the gears of the driving shaft together with means for shifting said gears to vary the speed ratio between the driving shaft and the driven shaft means.

The object of our invention is to provide an improved variable gear transmission arrangement of the kind above specified. Another object of our invention is to provide an improved remote gear shift control mechanism for variable speed gear transmissions.

For a consideration of what we believe to be novel and our invention, attention is directed to the following description and the claims appended thereto in connection with the accompanying drawing.

The single figure of the drawing illustrates diagrammatically an embodiment of our invention.

The arrangement in the present example includes two devices 10 and 11 arranged to be alternately driven by a motor 12 through a variable gear transmission mechanism 13. The gear transmission mechanism 13 comprises driven shaft means, in the present example two driven shafts 14 and 15 with pinions 16 and 17 respectively meshing with gears 18 and 19 respectively. The gears 18 and 19 form part of the devices 10 and 11 respectively. The shaft 14 carries two other gears 20 and 21 and the shaft 15 carries two other gears 22, 23. The gears 20 to 23 are cooperatively associated with gears 24, 25, 26 and 27 secured to a hollow spindle or sleeve 28 axially slidable on a driving shaft 29 and connected to the latter by a key 30. Thus the spindle 28 while slidable on the shaft 29 is positively driven by the latter. The shaft 29 is driven by a worm gear 31 from the shaft of the motor 12. In the position shown the driving gear 24 meshes with the driven gear 20 so that torque is transmitted from the motor 12 to the device 10. When the spindle 28 is moved to the right the gears 20, 24 are disengaged and the driving or second gears 25, 26 and 27 are successively brought into engagement with the corresponding driven or first gears 21, 22 and 23 respectively. The gear shifting mechanism according to our invention includes a hydraulic motor 32 which has a cylinder 33 with a piston 34 slidably disposed therein and secured to a piston rod 35 connected at its right-hand end to an arm 36 carrying a roller 37 disposed between two collars 38 on the sleeve 28. The ends of the cylinder 32 have supply ports 39 connected to a conduit 40 for conducting fluid under pressure to both ends of the cylinder. The connection of the conduit 40 to the ports 39 includes restrictions or orifices 40a. An intermediate portion of the cylinder wall is provided with a plurality of axially spaced outlet ports 41, 42, 43 and 44. In the present example there are four ports corresponding in spacing and number to the spacing and number of the different gear positions. Each port 41 to 44 is connected by a separate conduit or conduit branch 45 including a normally closed valve 46 to a conduit 47 with a bleed hole 48. The valves 46 are remote-controlled by solenoids 49 connected to a source of current supply 50 through pushbutton switches 51, 52, 53, 54 respectively. In the position shown the piston 34 is in alignment with or covers the port 41. The four valves 46 are in closed position, the solenoids 49 being deenergized. The fluid pressures on opposite sides of the piston 34 are balanced. If now the valve 46 associated with the port 42 is opened by closing the pushbutton 52, fluid under pressure is discharged from the right-hand side of the piston 34 through conduit 47 and the bleed hole 48. This causes unbalance of pressure on opposite sides of the piston 34, resulting in movement of the piston 34 towards the right until the piston covers the port 42. Upon movement of the piston 34 into line with the port 42 the driving gear 25 is brought into mesh with the driven gear 21. If thereafter the pushbutton 54 is closed the piston 34 is moved further to the right into alignment with the port 44, thus effecting engagement between the driving gear 27 and the driven gear 23. The switches 51 to 54 may be electrically interlocked in known manner so that only one can be closed at one time.

In case the driving gears are normally rotated at high speed it is desirable to reduce the speed and to effect the gear shifting at low speed of the driving gears. Such slow speed facilitates the meshing of the driving gears with the corresponding driven gears. In the present example the motor 12 during normal operation is connected to the line 50 through a circuit including a conductor 55, an automatic control 56, a conductor 57 including a contact member 58 normally biased towards closing position by a spring 59 and a conductor 60 connected to one side of the line 50 and another conductor 61 connecting the motor 12 directly to the other side of the line 50. According to our invention we provide means for automatically rendering the automatic control 56 inoperative and for connecting the motor 12 through a resistor to the line 50 during the gear shift operation. This is accomplished by the provision of means including a pressure responsive device 62 having a bellows secured at its left-hand end to a support 63 and connected by a pipe 64 to the conduit 47. The right-hand end of the bellows is connected by a rod 65 to the contact-making member 58 to effect opening of the latter upon a certain increase in pressure in the conduit 47. The spindle 65 carries another contact-making member 66 for closing contacts 67 to connect the motor 12 to the line 50 through a resistor 62. Assuming that the bleed hole 48 discharges to atmosphere, the pressure in the conduit 47 is normally atmospheric pressure. If now one of the valves for controlling the ports 42, 43, 44 is opened, fluid under pressure is discharged from the right-hand end of the cylinder 32, causing movement of the piston 34 to the right in the manner described above. The discharge of fluid under pressure causes increase in pressure in the conduit 47 and through the pipe 64 in the bellows 62 whereby the latter expands and causes opening movement of the contact-making member 58 and closing of the contact 67 by the contact-making member 66, thus connecting the motor 12 to the line 50 through the resistor 68 to slowly rotate the motor 12 during the gear shift operation. In order to assure an increase in pressure in the bellows 62 to cause expansion of the latter upon opening of one of the valves the hole or restriction 48 is preferably made of a size slightly smaller than the restrictions 40a in the conduit 40. Thus the supply of fluid under pressure through the conduit 40 to the cylinder will be sufficient to effect an increase in pressure in the pipe 64 and the bellows 62 communicating therewith upon opening of one of the valves 46. The contacts 67 remain closed until the piston 34 has reached its new position whereupon the pressure in the conduit 47 drops to atmospheric pressure, resulting in opening of the contacts 67 and reclosing of the normal operating circuit of the motor 12. Thus during gear shifting operation the speed of the motor 12 is automatically reduced and upon completion of the gear shifting the motor assumes its normal operation.

What we claim as new and desire to secure by Letters Patent of the United States is:

1. Variable speed gear transmission comprising driven shaft means with a plurality of spaced first gears, a driving shaft with a plurality of axially spaced second gears connected thereto, and means for shifting the second gears into different positions to vary the speed ratio between the driving shaft and the driven shaft means, said shifting means including a hydraulic motor having a cylinder with an admission port for fluid under pressure at each end, a plurality of axially spaced discharge ports in an intermediate portion of the cylinder, a piston slidably disposed in the cylinder having a stem connected to the second gears, a source of fluid under pressure normally communicating with said ports, separate valved conduits connected to said discharge ports and means for rotating the second gears at a predetermined speed upon opening of one of the valved conduits.

2. Variable speed gear transmission comprising driven shaft means with a plurality of first gears thereon, a driving shaft with a plurality of second gears thereon each for cooperation with one of the first gears, and means for shifting the second gears to vary the speed ratio between the driven shaft means and the driving shaft, a hydraulic motor for shifting the second gears, said motor having a cylinder with supply ports at the ends and axially spaced discharge ports at an intermediate portion thereof, a piston slidably disposed in the cylinder and connected to the second gears, means for continuously conducting fluid under pressure to the supply ports, conduit means connected to the outlet ports including a valve for each port, remote control means selectively to open any one of the valves to effect movement of the piston into alignment with a particular port and means for rotating the driving shaft at a predetermined speed upon opening of one of the valves to facilitate meshing engagement between the first and second gears.

3. Variable speed gear transmission comprising a driven shaft with a plurality of first gears thereon, a driving shaft, a motor for the driving shaft, means including a sleeve with a plurality of second gears secured thereto and axially movable on the driving shaft to transmit torque between the driving shaft and the driven shaft at different speed ratios, a hydraulic motor having a cylinder with supply ports at its ends and a plurality of axially spaced discharge ports at an intermediate portion, a piston movable in the cylinder and connected to said sleeve, a conduit having a plurality of branches each with a normally closed valve and connected to one of the outlet ports, and means for selectively opening any one of said valves and simultaneously causing the motor to rotate at low speed.

4. Variable speed gear transmission comprising a driven shaft with a plurality of first gears thereon, a drive shaft, a motor for the drive shaft, means including a sleeve with a plurality of second gears secured thereto and axially movable on the drive shaft to transmit torque between the drive shaft and the driven shaft at different speed ratios, a hydraulic motor having a cylinder with fluid pressure supply ports at its ends and a plurality of axially spaced discharge ports at an intermediate portion, a piston movable in the cylinder and connected to said sleeve, a conduit with a bleed hole having a plurality of branches each with a normally closed valve and connected to one of the outlet ports, means for selectively opening the valves, and means including a pressure responsive device connected to the conduit and a source of supply for the drive motor to effect slow rotation thereof upon opening of one of the valves.

THEODORE M. BERRY.
ALFRED H. CANADA.